(12) United States Patent
Deguara

(10) Patent No.: US 11,067,047 B2
(45) Date of Patent: Jul. 20, 2021

(54) EXTERNAL STARTER MOTOR

(71) Applicant: Pierre Deguara, Brooklyn (AU)

(72) Inventor: Pierre Deguara, Brooklyn (AU)

(73) Assignee: Pierre Deguara, Brooklyn (AU)

( * ) Notice: Subject to any disclaimer, the term of this patent is extended or adjusted under 35 U.S.C. 154(b) by 0 days.

(21) Appl. No.: 16/661,045

(22) Filed: Oct. 23, 2019

(65) Prior Publication Data

US 2020/0124011 A1 Apr. 23, 2020

(30) Foreign Application Priority Data

Oct. 23, 2018 (AU) ................................ 2018904017

(51) Int. Cl.
  *F02N 11/08* (2006.01)
  *H02K 7/18* (2006.01)
  *G01J 1/42* (2006.01)

(52) U.S. Cl.
  CPC ........ *F02N 11/0803* (2013.01); *F02N 11/087* (2013.01); *F02N 11/0862* (2013.01); *G01J 1/4204* (2013.01); *H02K 7/1815* (2013.01); *F02N 2011/0874* (2013.01); *F02N 2200/0802* (2013.01)

(58) Field of Classification Search
  CPC .. F02N 11/08; F02N 11/0803; F02N 11/0862; F02N 11/087; G01J 1/42; G01J 1/4204; H02K 7/18; H02K 7/1815
  USPC ............. 123/179.4; 73/114.59; 701/110–114
  See application file for complete search history.

(56) References Cited

U.S. PATENT DOCUMENTS

| | | | | |
|---|---|---|---|---|
| 6,923,696 | B2 * | 8/2005 | Okuyama | B63H 21/22 123/179.1 |
| 2010/0250036 | A1 * | 9/2010 | Bamba | F02D 25/00 701/21 |
| 2010/0305820 | A1 * | 12/2010 | McGee | B60W 10/06 701/54 |
| 2020/0332754 | A1 * | 10/2020 | Fliearman | F02N 11/006 |

\* cited by examiner

*Primary Examiner* — John Kwon
*Assistant Examiner* — Johnny H Hoang
(74) *Attorney, Agent, or Firm* — Trevor T. Graves; King & Schickli, PLLC

(57) ABSTRACT

An external starter motor for an internal combustion engine, comprising: a power supply; an electric motor for producing torque; a dog rotatable by the electric motor and adapted to be axially movable into and out of engagement with a starting mechanism to turn over the internal combustion engine; and a circuit for detecting the presence of an output signal from the internal combustion engine and energising the external starter motor by the power supply when detecting the presence of the signal.

10 Claims, 4 Drawing Sheets

A

B

EXTERNAL STARTER MOTOR

This application claims the benefit of Australian Patent Application No. 2018904017, filed Oct. 23, 2018, the disclosure of which is incorporated herein by reference.

TECHNICAL FIELD

The present invention generally relates to external starter motors used to turn over (crank) an internal combustion engine so as to initiate operation under its own power.

BACKGROUND OF INVENTION

External starter motors are often used to turn over large, high powered internal combustion engines with high compression ratios, including those engines used in motorsports such as drag racing. The amount of torque required to turn over high powered engines can make the provision of an internal starter motor weight prohibitive, particularly when taking into account a battery, or other power supply, capable of supplying the requisite torque. An electric current which is supplied from the battery to the external starter motor when starting an engine is very high, e.g., 1000 amperes (A) or more. Furthermore, there are also advantages in turning over high powered engines until users are happy with the engine speed and oil pressure before turning the ignition on and thus starting the engine. This process can be effectively controlled with an external starter motor.

It is becoming increasingly common in motorsports for high powered engines to have automatic transmissions. Generally, automatic transmissions are operated with a shift lever movable into select positions for placing the transmission into corresponding stopping and driving gear conditions without the use of a friction clutch, such as "Park", "Neutral", or "Drive". Once the vehicle is placed in a driving gear condition, gear ratios can automatically change, freeing the driver from having to shift gears manually.

A popular form of automatic transmission is the hydraulic automatic transmission. The system uses a fluid coupling in place of a friction clutch, and accomplishes gear changes by hydraulically locking and unlocking a system of planetary gears. Due to an effect of the clutchless fluid coupling design, vehicles fitted with this type of transmission can move (creep) while in a driving gear, even at idle. This can be a safety concern for users of external starter motors, particularly when engaging the external starter motor in front of a high powered vehicle, which may have serious consequences.

Another popular form of transmission is a semi-automatic transmission (also known as a clutch-less manual transmission). A clutch-less manual also removes the need for a clutch pedal which the driver otherwise needs to depress before making a gear change since the clutch itself is actuated by electronic equipment or the like which can synchronize the timing and torque required to make gear shifts.

Vehicles fitted with this type of transmission, and indeed manual transmissions, can roll and have the symptoms of being in "Neutral" (even while turning the engine over) when in a driving gear as they generally rely on engine rotation to provide oil pressure to operate the main components of the transmission. In this case, once the engine starts, engine rotation rises dramatically together with the oil pressure having the effect of hydraulically locking the system of planetary gears and moving the vehicle forward. When such a transmission is fitted to a high powered internal combustion engine such as those used in motorsport, the vehicle may dramatically jump forward—sometimes in the order of one or two car lengths in a fraction of a second. This can be a safety concern for users of external starter motors if the transmission is mistakenly placed in a driving gear condition.

It would be desirable to provide an external starter motor capable of receiving a signal from an internal combustion engine having an automatic transmission indicative of whether the transmission is in a driving gear, e.g., in "Drive".

It would also be desirable to provide an external starter motor capable of receiving a signal from an internal combustion engine when the drivetrain is disconnected from the engine, whether the transmission is an automatic transmission or manual transmission, before the external starter motor is energised.

It would also be desirable to provide a system for preventing energisation of an external starter motor for an internal combustion engine having an automatic transmission when the transmission is in a driving gear, which is simple to retrofit to existing vehicles.

The invention is suitable for external electric starter motors when starting large, high powered internal combustion engines having an automatic transmission such as those used in motorsport, and it will be convenient to describe the invention in relation to that exemplary, but non-limiting, application. It will be appreciated by those skilled in the art, that starter motors can be electric, pneumatic, or hydraulic. In the case of very large engines, the starter motor may be another internal combustion engine.

A reference herein to a patent document or other matter which is given as prior art is not to be taken as an admission or a suggestion that the document or matter was known or that the information it contains was part of the common general knowledge as at the priority date of any of the claims.

SUMMARY OF INVENTION

According to an aspect of the present invention, there is provided an external starter motor for an internal combustion engine, comprising: a power supply; an electric motor for producing torque; a dog rotatable by the electric motor and adapted to be axially movable into and out of engagement with a starting mechanism to turn over the internal combustion engine; and a circuit for detecting the presence of an output signal from the internal combustion engine and energising the external starter motor by the power supply when detecting the presence of the signal.

In one or more embodiments, the signal is a light level and the circuit comprises a photosensor and starter circuit responsive to the light level detected by the photosensor to energise the external starter motor when the detected light level is above a predetermined threshold. Advantageously, this may provide optical isolation such that the signal is transferred between two isolated circuits using light and thus reduce the potential for arcing which may ignite combustible vapours in its vicinity.

In one or more embodiments, the signal is a voltage level and the circuit comprises a mechanical engagement or switch to energise the external starter motor when the detected voltage level is above a predetermined threshold. The signal may be a low voltage control signal to control a relay, which is capable of handling and switching very high-voltage or very high-power circuits. The relay may include a protective diode connected in parallel with the power supply. The diode may be electrically connected across the relay coil to avoid back EMF created when the relay coil switches off.

In one or more embodiments, the starter circuit is a relay connected in parallel with a starter solenoid. The relay may be fixed on the outside of the external starter motor; e.g., on the starter casing or on the pedestal of the external starter motor. The relay coil may be energised by a movable contact ring which, under the action of using the external starter motor, is adapted for cooperation with at least one pair of fixed contacts carried by an annular contact carrier plate of insulating material around the starting mechanism to turn over the internal combustion engine.

In one or more embodiments, the circuit comprises a transistor, the relay being coupled to respond to the state of conduction of the transistor with the photosensor being connected to control the state of conduction.

In one or more embodiments, the circuit comprises two transistors coupled in a bistable configuration, the relay being coupled to respond to the state of conduction of one transistor with the photosensor being connected to control the state of conduction of the other transistor. The bistable circuit is capable of keeping the external starter motor connected to its power supply source (via a relay, MOSFET or Thyristor, when high power is required) for an indefinite time, until a user, or a mechanical device switches off the entire circuit.

In one or more embodiments, the circuit may comprise a monostable circuit including a "555 Timer" to drive the external starter motor for a limited time. In other words, a monostable circuit may be employed as a timer capable of keeping the external starter motor connected to its power supply source for a pre-established time.

In one or more embodiments, the circuit may further comprising a user-operable switch arranged so that the user can energise the external starter motor only when the light level detected by the photosensor is above the predetermined threshold. The switch may be a mechanical switch which comprises mechanical contacts which open or close in response to manual activation. Such devices may include simple manual switches, push button switches, mechanical throws, knobs, toggles or dollys, rockers, dials, triggers or the like, with "on" and "off" settings.

In one or more embodiments, the external starter motor may further comprise a face plate having a substantially planar face in which an opening is formed for housing the photosensor and reducing the quantity of ambient light to which it is subjected. The photosensor may be mounted in a holder that has an infrared band stop, or RG band pass filter.

In one or more embodiments, the external starter motor may further comprise one or more locating lugs which are engaged with locating holes on the internal combustion engine to locate and support the external starter motor with the starting mechanism to turn over the internal combustion engine. The locating lugs may extend laterally outward from each side of the external starter motor and also act to locate the photosensor over a light source positioned on the internal combustion engine. The locating lugs may be receivable in a slot or the like which allows the lugs to pass through and on rotation prevent the lugs from being withdrawn.

In one or more embodiments, the photosensor may be disposed proximal to the dog. The circuit may be disposed on a pole housing of the external starter motor.

According to another aspect of the present invention, there is provided a system for preventing energisation of an external starter motor for an internal combustion engine having an automatic transmission and a shift lever movable into select positions for placing the transmission into corresponding stopping and driving gear conditions, comprising: a circuit for generating an output signal indicative of at least one gear condition; and a circuit disposed on the external starter motor for detecting the presence of the signal and preventing energisation of the external starter motor under driving gear conditions.

In one or more embodiments, the circuit may be disposed on the external starter motor and comprise a photosensor and starter circuit responsive to the light level detected by the photosensor to prevent energisation of the external starter motor when the detected light level is below a predetermined threshold.

In one or more embodiments, the output signal is a light level and the circuit disposed on the external starter motor comprises a photosensor and starter circuit responsive to the light level detected by the photosensor to energise the external starter motor when the detected light level is above a predetermined threshold. Advantageously, this may provide optical isolation such that the signal is transferred between two isolated circuits using light and thus reduce the potential for arcing which may ignite combustible vapours.

In one or more embodiments, the output signal is a voltage level and the circuit disposed on the external starter motor comprises a mechanical engagement or switch to energise the external starter motor when the detected voltage level is above a predetermined threshold. The signal may be a low voltage control signal to control a relay, which is capable of handling and switching very high-voltage or very high-power circuits. The relay may include a protective diode connected in parallel with the power supply. The diode may be electrically connected across the relay coil to avoid back EMF created when the relay coil switches off.

In one or more embodiments, the circuit disposed on the external starter motor comprises a photosensor and starter circuit responsive to the light level detected by the photosensor to prevent energisation of the external starter motor when the detected light level is below a predetermined threshold.

In one or more embodiments, the signal is indicative of the automatic transmission assuming at least one predetermined driving gear condition which induces movement of a vehicle. The signal may also be indicative of a condition where the drivetrain is disconnected from the internal combustion engine, whether the transmission is an automatic transmission or manual transmission.

In one or more embodiments, the external starter motor may comprise a user-operable switch arranged so that the user cannot energise the external starter motor when the light level detected by the photosensor is below the predetermined threshold.

In one or more embodiments, the external starter motor may further comprise a face plate having a substantially planar face in which an opening is formed for housing the photosensor and reducing the quantity of ambient light to which it is subjected.

In one or more embodiments, the external starter motor may further comprise one or more locating lugs which are engaged with locating holes on the internal combustion engine to locate and support the external starter motor with the starting mechanism to turn over the internal combustion engine. The lugs may also provide alignment for the photosensor and light level. The light level may be emitted from from a light source disposed proximal to the starting mechanism to turn over the internal combustion engine.

In one or more embodiments, the photosensor may be disposed proximal to a dog adapted to be axially movable into and out of engagement with a starting mechanism to turn over the internal combustion engine.

BRIEF DESCRIPTION OF DRAWINGS

The invention will now be described in further detail by reference to the accompanying drawings. It is to be understood that the particularity of the drawings does not supersede the generality of the preceding description of the invention.

DETAILED DESCRIPTION

Figure 1:
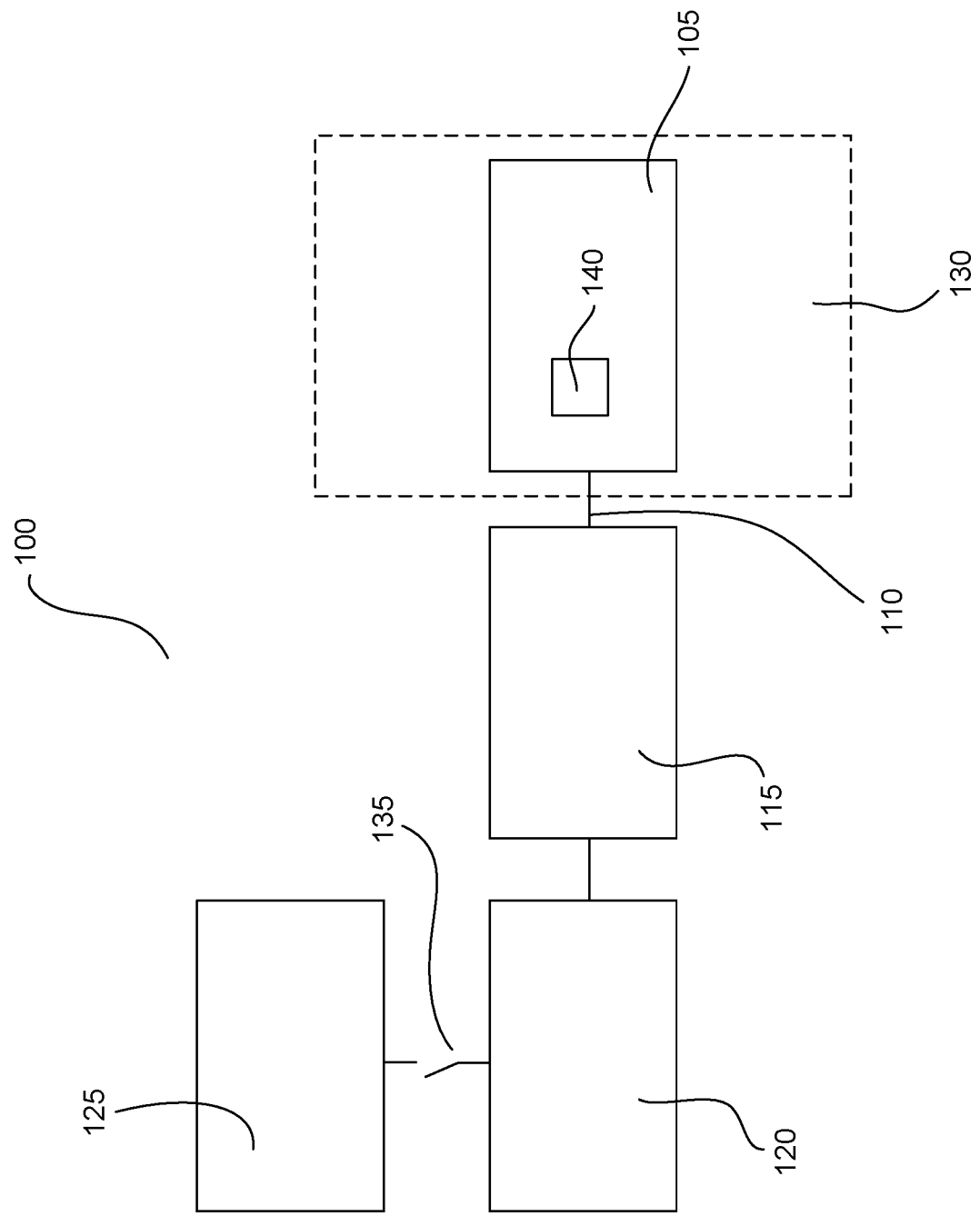
FIG. 1 is a schematic diagram of an exemplary embodiment of an external starter motor.

Referring to FIG. 1, there is shown a simplified schematic diagram 100 of an external starter motor 115. The external starter motor 115 includes a power supply 125, a user-operable switch 135 and a circuit 120, all electrically connected as shown. The circuit 120 detects the presence of an output signal 110 from an internal combustion engine 105 fitted in vehicle 130 and energises the external starter motor 115 when detecting the presence of the signal 110.

In one or more embodiments, the external starter motor 115 includes a user-operable switch 135 so that the user may energise the external starter motor only when the signal 110 is detected by the circuit 120. The user-operable switch 135 may be disposed on the external starter motor 115, and it will be appreciated that this may be provided in the form of a momentary trigger switch for initiating energisation of the external starter motor 115.

In one or more embodiments, the signal 110 is a light level provided by a light source 140, and those skilled in the art will recognise suitable components for the light source 140, for example: a light emitting diode (LED), incandescent light, halogen light, strobe light and coloured light. The light source 140 may be provided by a single LED, according to one embodiment. According to another embodiment, a plurality of LEDs may be employed as the light source 140. Other light sources may be employed along with various light pipes, lenses, panels and flashing lighting configurations. The light source 140 is disposed proximal to a starting mechanism (not shown) used to turn over the internal combustion engine 105.

In one or more embodiments, the signal 110 is a voltage level provided by a voltage source. The voltage source is conventional and may include a removable battery, for example, a single 12V battery. As will be appreciated, the power requirement for the voltage source differs from that of the external starter motor 115, in that it is much lower. The voltage source is disposed proximal to a starting mechanism (not shown) used to turn over the internal combustion engine 105.

To turn over the internal combustion engine 105, electric power is supplied from the power supply 125 (remote from the vehicle 130) to the external starter motor 115, which is energised based on the signal 110, to cause a dog mounted thereon to rotate the crankshaft. Accordingly, it is convenient to locate the light source 140 (or voltage source) proximal to the starting mechanism so that it can be sensed in use.

As will be appreciated by those skilled in the art, various mechanisms may be employed to turn over internal combustion engines, including meshing a pinion on the external starter motor with a ring gear mounted on the crankshaft. In this application, light source 140 (or voltage source) may be disposed proximal to the ring gear.

In some motorsport applications, the external starter motor is connected directly to the crankshaft via a dog so that once engaged they move in unison. That is, the external starter motor shaft and crankshaft move in order to transmit the torque necessary to turn the engine over. In this application, the light source 140 (or voltage source) may be disposed proximal to the crankshaft. For example, via pins on a face that aligns with a portion of the crankshaft and come into electrical contact with a portion of the external starter motor e.g., via another portion having a substantially planar face in which a hole is formed for housing corresponding pads and engaging the pins against those pads.

In supercharged engines, where power for the supercharger is provided mechanically by means of a belt, gear, shaft, or chain connected to the engine's crankshaft, the light source 140 (or voltage source) may be may be disposed proximal to a dog disposed on the supercharger itself in order to indirectly transmit the torque necessary to turn the engine over.

Figure 2:
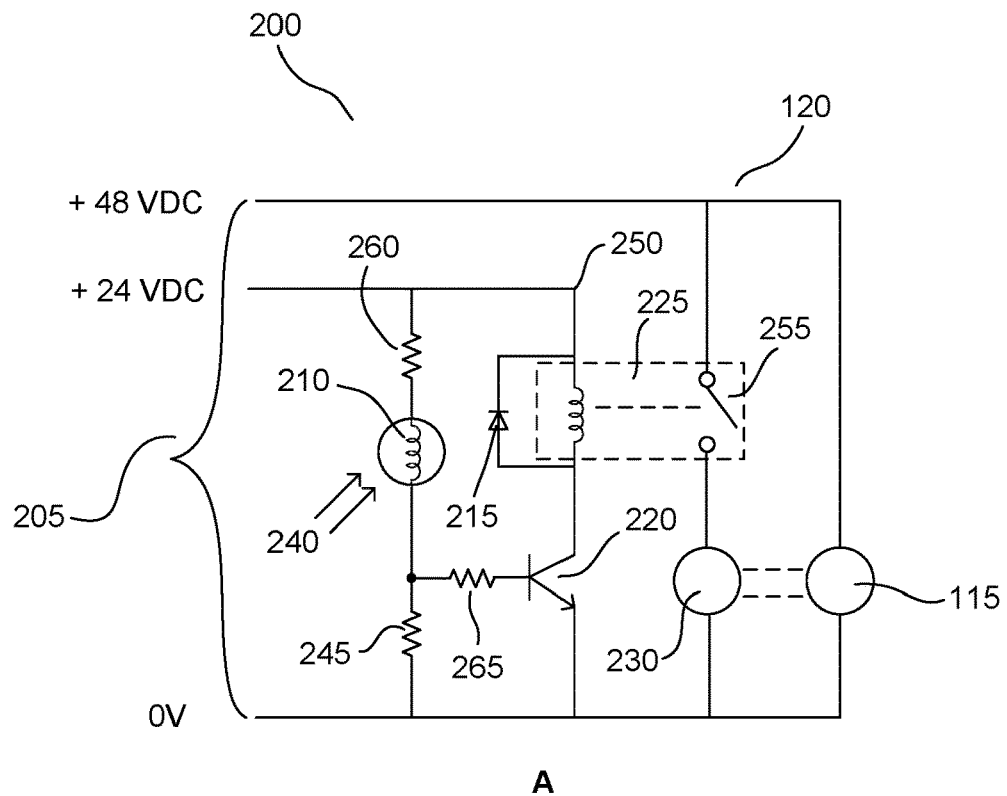
FIG. 2 is a schematic diagram of two control circuits (A and B) of an exemplary embodiment of an external starter motor employing a photosensor.
Figure 2:
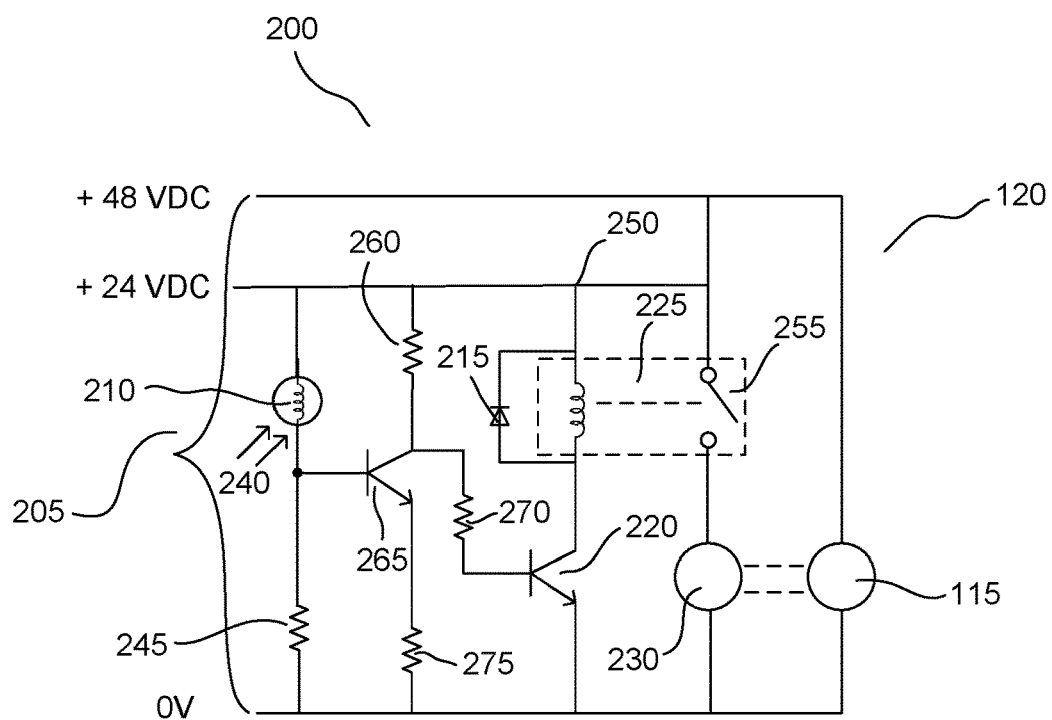

The circuit 120 includes components which will be discussed with further reference to FIG. 2 and FIG. 3. However, it will be appreciated that the circuit 120 may be provided in the form of a printed circuit board (PCB) assembly fastened to the external starter motor 115, for example on a pole housing. For this purpose, the circuit 120 may comprise a PCB substrate, mechanically supporting the components, for example, FR-4 glass epoxy.

Referring to FIG. 2A, there is shown a circuit 120, including a photosensor 210 and starter circuit 225 responsive to a light level 240 detected by the photosensor 210 to energise the external starter motor 115 when the detected light level 240 is above a predetermined threshold set by resistor 245. The operation of the circuit 120 is controlled by the photosensor 210, shown as a light dependent resistor (LDR), whose resistance falls as the light 240 incident thereon increases. As will be appreciated by those skilled in the art, LDRs are often used to indicate the presence or absence of light, or to measure the light intensity e.g., the quantity of light to which it is subjected. However, it should be appreciated that other photosensors may be employed to energise the starter motor 115, such as, but not limited to, photodiodes, phototransistors, phototubes, charge-coupled devices, photovoltaic devices, thermal devices, photorefractive devices or the like.

In one or more embodiments, the starter circuit 225 is a relay including a protective diode 215 connected in parallel with an external power supply 205 for providing power to a starter solenoid 230, which ultimately powers the external starter motor 115. The coil of the relay 225 is in the collector circuit of NPN transistor 220 so that the state of the relay contact is controlled by the state of conduction of transistor 220. The relay has a common contact 250 which is connected to the power supply 205 i.e., an external battery capable of discharging a large current within a short period of time, and a normally open contact 255 connected to the starter solenoid 230. The relay 225, is a conventional mechanical relay. It should be appreciated that other switching means may be employed to energise the starter motor 115, such as, but not limited to: solid state relays (SSRs) with optical isolation, i.e., employing an internal optical coupler in combination with a semiconductor element to switch power; solid state relays with transformer isolation; reed relays; thyristors; and, field effect transistors (FETs), i.e., FET and MOSFET switches for relay-type functions. Because of the necessary starting energy and starting power (approximately 500 Nm of cold-starting torque) required for many high powered engines it is often not feasible to use a typical 12 to 24 V battery, as such selected components may need to be capable of switching many hundred ampere loads.

The emitter of the transistor 220 is connected to the negative site of the external power supply 205.

It will be appreciated by those skilled in the art that the value of resistors 245, 260 and 265 are chosen in relation to one another and the light and dark resistance of the LDR 210 so that when the light 240 falling on the LDR exceeds the value at which it is desired to turn on the external starter motor 115, the transistor 220 is turned on, but not held on. For this purpose, the photosensor 210 is preferably located proximal to a dog adapted to engage and disengage with a starting mechanism to turn over the internal combustion engine i.e., where it "sees" the light 240 directed towards it continuously while engaged. Other positions for the photosensor 210 are possible although it may be necessary that it be shielded from other lights, including ambient light and the vehicles own lights. LDRs may have some heat sensitivity, so the LDR may be mounted in a holder that has an infrared band stop, or RG band pass filter.

Referring to FIG. 2B, there is shown a circuit 120 similar to that shown in FIG. 2A albeit employing a pair of NPN transistors (265, 220) cross coupled in a bistable configuration by resistors 260 and 245. The coil of the relay 225 is in the collector circuit of transistor 220 so that the state of the relay contact is controlled by the state of conduction of transistor 220. The relay has a common contact 250 which is connected to the power supply 205 and a normally open contact 255 connected to the starter solenoid 230.

The emitter of the transistor 220 is connected to the negative site of the external power supply 205.

It will be appreciated by those skilled in the art that the value of resistors 245, 260, 270 and 275 are chosen in relation to one another and the light and dark resistance of the LDR 210 so that when the light 240 falling on the LDR exceeds the value at which it is desired to turn on the external starter motor 115, the transistor 220 is turned on and held on, and vice versa. To that end, the starter motor 115 may be energised and de-energised without the provision of a continuous light 240. Advantageously, the photosensor 210 need only be momentarily located proximal to a dog adapted to engage and disengage with a starting mechanism to turn over the internal combustion engine i.e., where it momentarily "sees" the light 240 directed towards it and not necessarily continuously.

As discussed with reference to FIG. 1, a manual switch may be provided to enable the user to energise the starter motor 115 but the circuit 120 is preferably arranged so that this switch is overridden when the predetermined light level 240 detected by the photosensor 210 is not exceeded so that in those circumstances the starter motor 115 cannot be started. The remaining elements shown in FIG. 2B are identical to FIG. 2A and so share the same references.

Advantageously, in this embodiment, it is possible to detect the receipt of signal 240 and energise the starter motor 115 with an optical arrangement, thereby suppressing arcing that may occur between electromechanical interfaces, which may have potential to ignite fuel vapour. This may occur when starting supercharged engines or engines fitted with another air compressing means driven by the engine to force induction of intake air into the combustion chamber. Often highly combustible starting fluid is sprayed into the air intake which may be in close proximity to a dog used to turn over the engine. Similarly, a flammable isopropyl alcohol de-icer is often sprayed on injector butterflies to prevent freezing.

Figure 3:
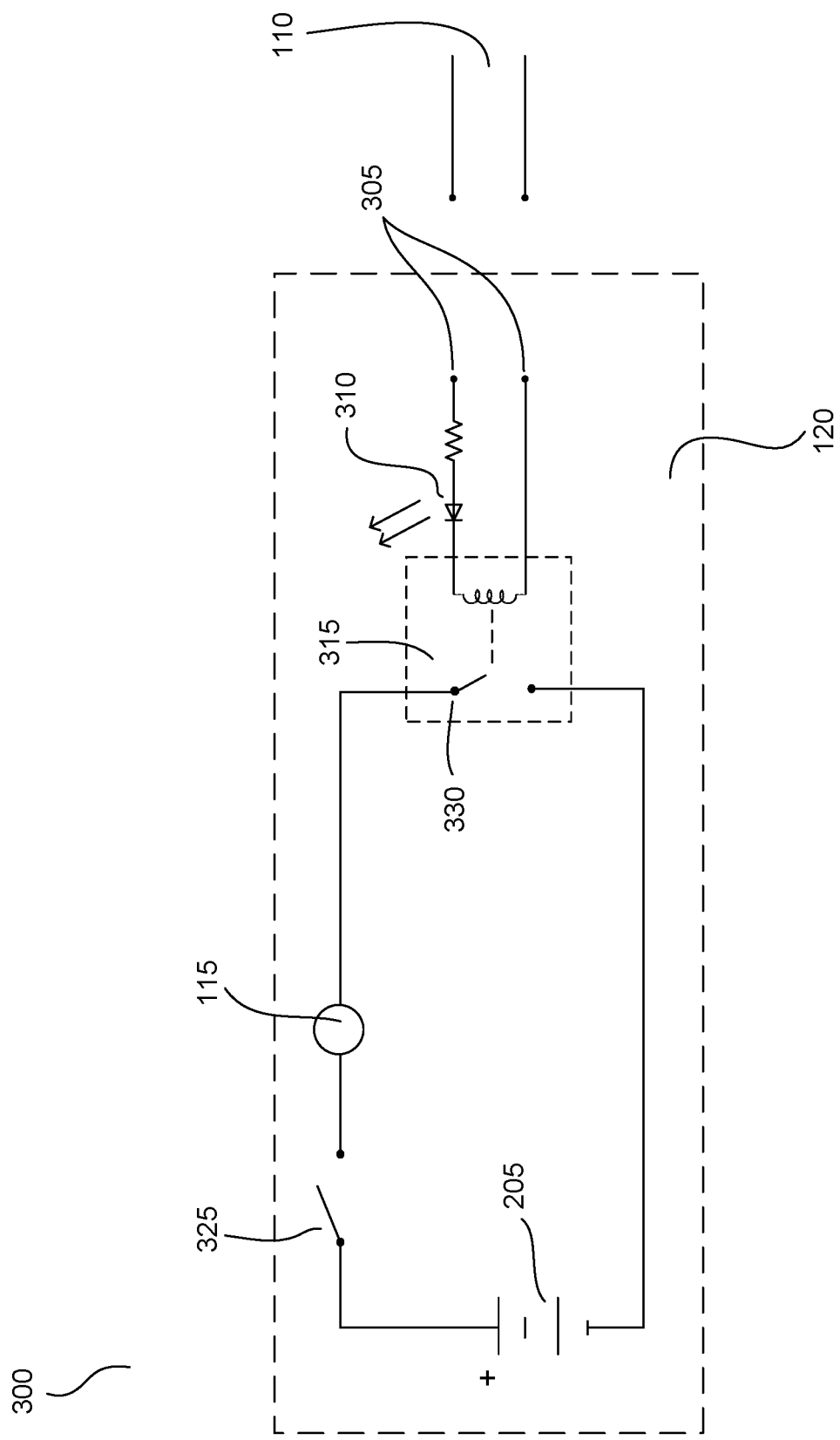
FIG. 3 is a schematic diagram of an exemplary embodiment of an external starter motor not employing a photosensor.

Referring now to FIG. 3, there is shown a there is shown an alternative embodiment of circuit 120 of simplified construction to that shown in FIG. 2A and FIG. 2B. The circuit includes a power supply 205 electrically connected to switch 325 and starter motor 115. A normally open, single pole, single throw relay 315 is placed in series with the switch 325 and the starter motor 115. The coil of the relay 315 is energised by external contacts 305 adapted to receive signal 110, a DC voltage level.

When the external contacts 305 receive the DC voltage level, the relay 315 coil is energised, closing normally open contact 330. In series with the external contacts 305 is an indicator light 310 (here a conventional LED in series with a resistor based on the LEDs forward voltage). The indicator light 310 shows a user of the external starter motor 115 that if the user-operable switch 325 is closed the starter motor 115 will be energised. As will be appreciated, the indicator light 310 will allow a user to prepare themselves for the transmission of massive torque loads to the internal combustion engine before closing switch 325.

In one or more embodiments, the external contacts 305 are proximal to a dog and are adapted to electrically engage and disengage with corresponding contacts on a starting mechanism to turn over the internal combustion engine (e.g., pins, pads, solder-bumps and the like, adapted to electrically engage mating connectors). For example, via pins on a face that aligns with a portion of the crankshaft that come into electrical contact with a portion of the external starter motor e.g., via another face having a substantially planar face in which a longitudinally aligned hole is formed for housing corresponding pads and electrically engaging the pins against those pads.

Advantageously, in this embodiment, it is possible to detect the receipt of signal 110 and energise the starter motor 115 with a simple mechanical engagement or switch, thereby simplifying the cost and assembly of the circuit 300, as shown in FIG. 3.

Figure 4:
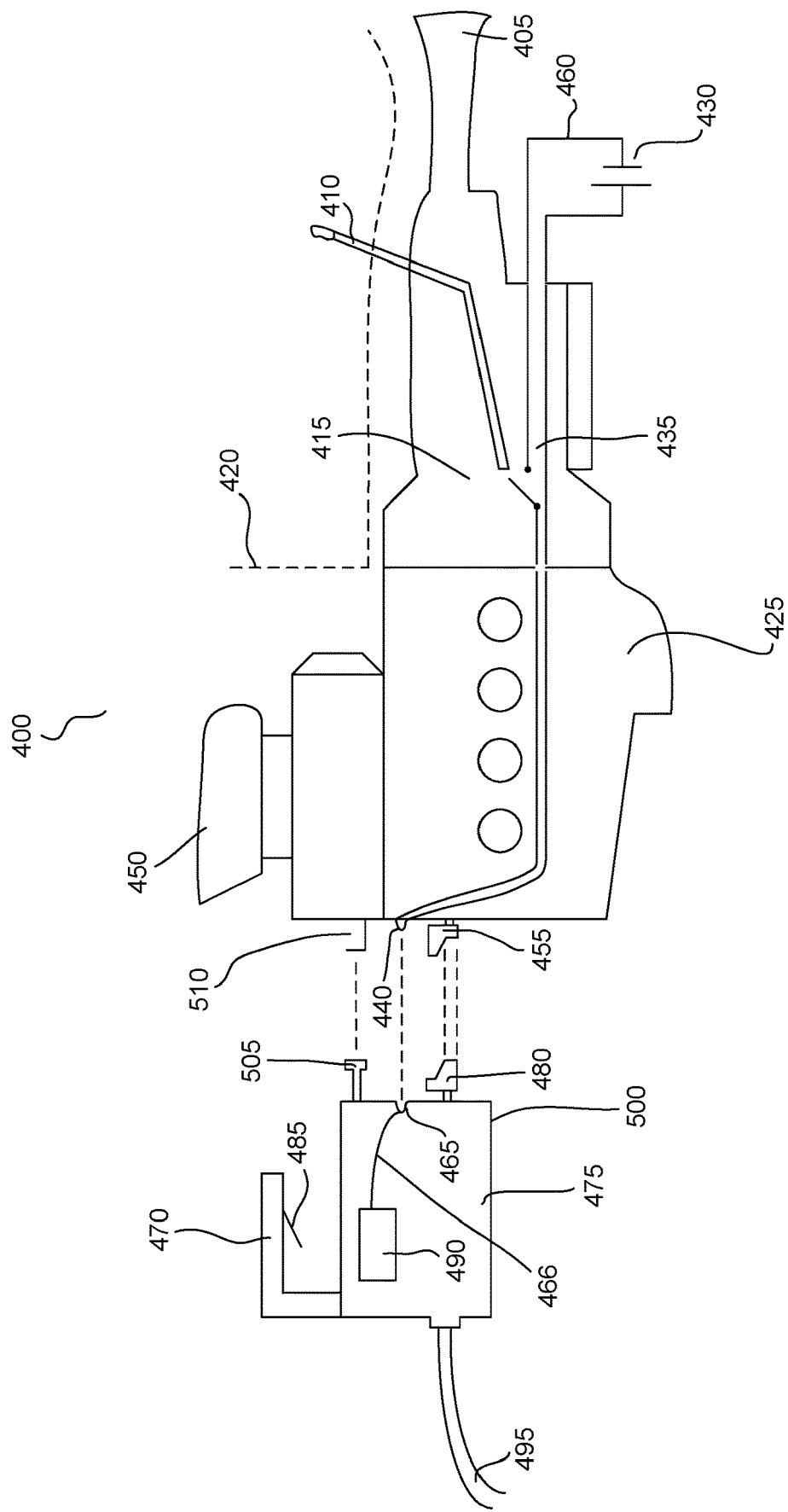
FIG. 4 is a schematic diagram of a system for preventing energisation of an external starter motor for an internal combustion engine having an automatic transmission.

Referring now to FIG. 4, there is shown a schematic diagram of system 400 for preventing energisation of an external starter motor 475 for an internal combustion engine 425 having an automatic transmission 405 and a shift lever 410 movable into select positions for placing the transmission 405 into corresponding stopping and driving gear conditions. The internal combustion engine 425 has an intake 450 and an automatic transmission 405 which is fitted to vehicle 420 (not shown). The shift lever 410 is mechanically connected to a switch 435 and electrically connected as shown with wires 460 to a battery 430 and light source 440. In one embodiment, the mechanical switch 435 is open when the shift lever is in a driving gear condition, for example "Drive" and the light source 440 is not illuminated. The mechanical switch 435 is closed when the shift lever is in a stopping gear condition i.e., inducing halt of the vehicle, and the light source 440 is illuminated. It should be appreciated that a plurality of mechanical switches may be employed.

It should also be appreciated that control circuitry may be employed for controlling the light source 44 based on the position of the shift lever 410. The control circuitry may employ a microcontroller or other circuitry for continuously monitoring the gear condition and controlling activation and deactivation of the light source 440.

According to the embodiment shown, the light source 440 is positioned above a dog 455 to receive a corresponding dog 480 of the external starter motor 475 which is adapted to be axially movable into and out of meshing engagement with the dog 455. In the embodiment shown, a user brings the dog 480 into contact with the dog 455 of the associated internal combustion engine 425 to start the operation thereof.

In operation, the use of ramped dogs, allows the external starter motor 475 and the starting mechanism (i.e., a crankshaft) 455 to rotate relative to each other if the two dogs are not aligned, because the ramped dogs are able to slide smoothly until they become aligned with the peripheral surface at which point the ramped dogs will drivingly mesh with the peripheral surface, thus preventing relative movement between the dogs 480, 455. This also prevents damage to the dogs during engagement. Further, such a configuration allows a user to manually engage the dog on the external starter motor 475 after it is located and supported over the starting mechanism 455. The dog 480 may be adapted to be axially movable into and out of meshing engagement with the corresponding dog 455 by a threaded arrangement or the like.

In one or more embodiments, the external starter motor 475 has a face 500 with a photosensor 465 mounted therein. When the dog 480 is engaged with the corresponding dog on the starting mechanism 455, the photosensor 465 is in communication with the light source 440. Here, the light source 440 and the photosensor 465 are in direct "line of sight" communication. However, it will be appreciated that light guides, light pipes, lenses, and fibres and any other light transmitting materials may be employed to provide the stated functions.

The external starter motor 475 includes two locating lugs 505 which are engaged with locating holes 510 on the internal combustion engine 425 to locate and support the external starter motor 475 with the starting mechanism 455 to turn over the internal combustion engine 425. The locating lugs 505 extend laterally outward from each side of the external starter motor 475 and also act to locate and lock the photosensor 465 over the light source 440. The locating lugs 505 may be receivable in a slot or the like which allows the lugs 505 to pass through and on rotation prevents the lugs 505 from being withdrawn.

The light sensor 465 is electrically connected to a starter circuit 490 positioned on the pole housing of the external starter motor 475 via wires 466. The starter circuit is responsive to the light level detected by the photosensor 465 and is adapted to prevent energisation of the external starter motor 475 when the detected light level is below a predetermined threshold, as discussed with reference to FIG. 2A and FIG. 2B. However, as will be appreciated, in some embodiments the starter circuit 490 may be adapted to prevent energisation of the external starter motor 475 when the detected light level is above a predetermined threshold, for example, if the light source 440 is illuminated in driving gear conditions, that is, the light source provides a signal indicative of the automatic transmission assuming gear condition which induces movement of the vehicle 420 e.g., "Drive".

In one or more embodiments, the external starter motor has a handle 470 and a switch 485 arranged so that the user can energise the external starter motor 475 only when the light level detected they the photosensor 440 is below the predetermined threshold, as discussed with reference to FIG. 1.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The present application may be used as a basis or priority in respect of one or more future applications and the claims of any such future application may be directed to any one feature or combination of features that are described in the present application. Any such future application may include one or more of the following claims, which are given by way of example and are non-limiting in regard to what may be claimed in any future application.

The claims defining the invention are as follows:

1. An external starter motor for an internal combustion engine, comprising:
   a power supply;
   an electric motor for producing torque;
   a dog rotatable by the electric motor and adapted to be axially movable into and out of engagement with a starting mechanism to turn over the internal combustion engine; and
   a circuit for detecting a presence of an output signal from the internal combustion engine and energising the external starter motor by the power supply when detecting the presence of the output signal, wherein the output signal is a light level provided by a light source positioned on the internal combustion engine, and wherein the circuit includes a photosensor and a starter circuit responsive to light detected by the photosensor to energise the external starter motor.

2. The external starter motor of claim 1, wherein the starter circuit is a relay connected in parallel with a starter solenoid.

3. The external starter motor of claim 2, wherein the relay includes a protective diode connected in parallel with the power supply.

4. The external starter motor of claim 2, wherein the circuit comprises a transistor, the relay being coupled to respond to a state of conduction of the transistor with the photosensor being connected to control the state of conduction.

5. The external starter motor of claim 2, wherein the circuit comprises two transistors coupled in a bistable configuration, the relay being coupled to respond to a state of conduction of one transistor with the photosensor being connected to control the state of conduction of the other transistor.

6. The external starter motor of claim 1, further comprising a user-operable switch arranged so that the user can energise the external starter motor.

7. The external starter motor of claim 1, further comprising a face plate having a substantially planar face in which an opening is formed for housing the photosensor and reducing a quantity of ambient light to which it is subjected.

8. The external starter motor of claim 1, further comprising one or more locating lugs which are engaged with locating holes on the internal combustion engine to locate and support the external starter motor with the starting mechanism to turn over the internal combustion engine.

9. The system of claim 1, wherein the photosensor is disposed proximal to the dog.

10. The external starter motor of claim 1, wherein the circuit is disposed on a pole housing of the external starter motor.

* * * * *